United States Patent
Lim (10) Patent No.: US 10,560,809 B2
(45) Date of Patent: Feb. 11, 2020

(54) POSITION PROVIDING METHOD AND APPARATUS THEREFOR

(71) Applicant: SK PLANET CO., LTD., Seongnam-si (KR)

(72) Inventor: Jaewoo Lim, Seongnam-si (KR)

(73) Assignee: SK PLANET CO., LTD., Seongnam-si, Gyeonggi-do (KR)

( * ) Notice: Subject to any disclaimer, the term of this patent is extended or adjusted under 35 U.S.C. 154(b) by 0 days.

(21) Appl. No.: 16/193,519

(22) Filed: Nov. 16, 2018

(65) Prior Publication Data

US 2019/0090095 A1    Mar. 21, 2019

Related U.S. Application Data

(63) Continuation of application No. PCT/KR2017/001463, filed on Feb. 10, 2017.

(30) Foreign Application Priority Data

Sep. 2, 2016 (KR) .................. 10-2016-0112936

(51) Int. Cl.
*H04W 4/029* (2018.01)
*G10L 15/22* (2006.01)
*G10L 15/26* (2006.01)
*G06T 7/73* (2017.01)
*G06F 16/29* (2019.01)
*G06K 9/00* (2006.01)

(52) U.S. Cl.
CPC .......... *H04W 4/029* (2018.02); *G06F 16/29* (2019.01); *G06K 9/00664* (2013.01); *G06T 7/73* (2017.01); *G10L 15/22* (2013.01); *G10L 15/265* (2013.01); *G06K 2209/25* (2013.01); *G06T 2207/30184* (2013.01)

(58) Field of Classification Search
CPC ......... H04W 4/09; H04W 4/029; H04W 4/18; H04W 88/02; G06T 7/73; G06T 2207/30184; G06K 9/00664; G06K 9/3258; G06K 2209/25; G06F 17/30241; G06F 16/29; G10L 15/22; G10L 15/265; G10L 15/26
USPC ............................... 455/456.1–457
See application file for complete search history.

(56) References Cited

U.S. PATENT DOCUMENTS

2014/0240575 A1* 8/2014 Kaneda .............. H04N 1/32101
                                                          348/333.01
2017/0359691 A1* 12/2017 Ling ..................... H04W 4/043

FOREIGN PATENT DOCUMENTS

| KR | 10-2012-0116478 A | 10/2012 |
| KR | 10-2014-0058861 A | 5/2014 |
| KR | 10-2014-0107736 A | 9/2014 |

* cited by examiner

*Primary Examiner* — Marisol Figueroa
(74) *Attorney, Agent, or Firm* — Fenwick & West LLP (57) ABSTRACT

The present disclosure provides a position providing apparatus installed in a server or a terminal device and configured to calculate a current position of a terminal device user by analyzing voice information or image information and to indicate the calculated position on a map database.

7 Claims, 8 Drawing Sheets

POSITION PROVIDING METHOD AND APPARATUS THEREFOR

CROSS-REFERENCE TO RELATED APPLICATIONS

The present application is a continuation of International Patent Application No. PCT/KR2017/001463, filed on Feb. 10, 2017, which is based upon and claims the benefit of priority to Korean Patent Application No. 10-2016-0112936, filed on Sep. 2, 2016. The disclosures of the above-listed applications are hereby incorporated by reference herein in their entirety.

TECHNICAL FIELD

The present disclosure relates to a position providing service. Particularly, the present disclosure relates to a position providing apparatus installed in a server or a terminal device and configured to calculate a current position of a terminal device user by analyzing voice information or image information and indicate the calculated position on map database, and also relates to a position providing method.

BACKGROUND ART

Details disclosed herein merely offer background information regarding embodiments and are not applicable as prior art.

With the remarkable development of information communication technology, various kinds of terminal devices such as a mobile communication terminal and a personal computer are evolving to perform a great variety of functions.

For example, today's mobile communication terminals not only provide a traditional voice communication function, but also offer various additional functions such as a data communication, a digital camera, a music or video player, a game, a broadcasting receiver, and the like.

In order to expand such functions executable in the terminal device, related technologies are continuously being developed centering on improvement of software as well as improvement of hardware.

Accordingly, various services are provided using the terminal device. One of them, there is a positioning or position determination or position providing service using a personal computer, a portable phone, or the like.

Further, in order to enter information into the terminal device, various input manners such as a keypad based input, a voice input, or an image input are available. Various analysis techniques may be used for analyzing such a voice or image input.

The positioning or position determination or position providing is a technique of identifying a precise location of a user's terminal device. As this technique, a global positioning system (GPS), cell ID based positioning, and the like are well known and widely used.

Also, for indoor positioning, an additional device such as a beacon device installed in an indoor space may be utilized.

Meanwhile, the user of the terminal device located in a certain complicated place such as a complex shopping center and an amusement park may need to know his or her position in order to find a desired destination.

In this case, the use of an additional infrastructure such as a beacon device may incur increases in capital expenditure and operating expense, which may become an obstacle to the activation of the position providing service. In addition, the use of GPS has a drawback of being incapable of determining a precise position of a user in a shadow area such as an indoor or underground area.

Therefore, there is a need to provide a service capable of identifying a user's current position by using only a user's terminal device without requiring any additional infrastructure regardless of GPS shadow areas.

SUMMARY

Accordingly, the present disclosure is to provide a position providing method and apparatus capable of calculating a current position of a user of a terminal device through analysis of voice or image information which is acquired when the user utters a name of a nearby building or facility existing within the range of view of the user or when the user takes a photograph of an appearance, signboard or logo of such a building or facility.

In addition, the present disclosure is to provide a position providing method and apparatus using only voice or image information acquired through a terminal device, without relying on a GPS or a beacon device, and allowing a user to easily find his or her current position by determining the current position in consideration of a positional relationship between the user and each building or facility and by offering the current position indicated on map database to the terminal device.

In order to accomplish the above objects, a position providing apparatus according to an embodiment of the present disclosure may comprise an information processing module configured to acquire voice information or image information about a plurality of buildings or facilities existing within a range of view of a user at a current position of the user, and to extract identification information of the plurality of buildings or facilities from the voice information or the image information; a position calculation module configured to acquire location information of the plurality of buildings or facilities from the voice information or the image information based on the identification information, and to calculate the current position of the user from the location information by considering a positional relationship between the user and each building or facility; and a storage module configured to store a map database including the identification information and the location information of the plurality of buildings or facilities.

In the apparatus according to an embodiment of the present disclosure, the information processing module may be further configured to extract the identification information of the plurality of buildings or facilities by converting the voice information into text or by analyzing text contained in the image information.

In the apparatus according to an embodiment of the present disclosure, the position calculation module may be further configured to associate and indicate the calculated current position with and on the stored map database.

In the apparatus according to an embodiment of the present disclosure, when the current position is calculated using the image information, the position calculation module may be further configured to acquire photographing direction information related to the image information through the information processing module, and to calculate the current position by further considering the acquired photographing direction information.

In order to accomplish the above objects, a position providing method performed by a position providing apparatus according to an embodiment of the present disclosure may comprise acquiring voice information or image information about a plurality of buildings or facilities existing within a range of view of a user at a current position of the user; extracting identification information of the plurality of buildings or facilities from the voice information or the image information; acquiring location information of the plurality of buildings or facilities from the voice information or the image information based on the identification information; and calculating the current position of the user from the location information by considering a positional relationship between the user and each building or facility.

In the method according to an embodiment of the present disclosure, the identification information of the plurality of buildings or facilities may be extracted by converting the voice information into text.

In the method according to an embodiment of the present disclosure, the identification information of the plurality of buildings or facilities may be extracted by analyzing text contained in the image information.

In the method according to an embodiment of the present disclosure, when the image information is acquired, photographing direction information related to the image information may be further acquired, and the current position may be calculated by further considering the acquired photographing direction information.

The method according to an embodiment of the present disclosure may further comprise associating and indicating the calculated current position with and on a stored map database.

In order to accomplish the above objects, a non-transitory computer-readable recording medium having a program, recorded thereon, for executing the above position providing method.

The present disclosure has effects of being capable of identifying a user's current position by using only a user's terminal device without requiring any additional infrastructure regardless of GPS shadow areas.

In addition, the present disclosure has effects of allowing a user to easily find his or her current position by analyzing voice or image information acquired via a terminal device, by determining the current position in consideration of a positional relationship between the user and each building or facility, and by offering the current position indicated on a map database to the terminal device.

DETAILED DESCRIPTION

Now, embodiments of the present disclosure will be described in detail with reference to the accompanying drawings.

In the following description and the accompanying drawings, however, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure.

Accordingly, it should be apparent to those skilled in the art that the following description about various embodiments of the present disclosure is provided for illustration purpose only and not for the purpose of limiting the disclosure as defined by the appended claims and their equivalents.

Additionally, the terms including expressions "first", "second", etc. are used for merely distinguishing one element from other elements and do not limit the corresponding elements. Also, these ordinal expressions do not intend the sequence and/or importance of the elements.

Further, when it is stated that a certain element is "coupled to" or "connected to" another element, the element may be logically or physically coupled or connected to another element. That is, the element may be directly coupled or connected to another element, or a new element may exist between both elements.

In addition, the terms used herein are only examples for describing a specific embodiment and do not limit various embodiments of the present disclosure. Singular forms are intended to include plural forms unless the context clearly indicates otherwise.

In addition, the term "comprise", "include", or "have", as well as derivatives thereof, means inclusion without limitation. That is, these terms are intended to specify the presence of features, numerals, steps, operations, elements, components, or combinations thereof, which are disclosed herein, and should not be construed to preclude the presence or addition of other features, numerals, steps, operations, elements, components, or combinations thereof.

In addition, the term "module" or "unit" used herein may refer to an element for performing at least one particular function, operation, or task and may be implemented by software and/or hardware.

Also, in the following description, especially in claims, the terms "a", "an", "one", and "the" may be used as both singular and plural meanings unless the context clearly indicates otherwise.

Now, a system, apparatus, and method for providing position information according to embodiments of the present disclosure will be described with reference to the accompanying drawings.

Figure 1:
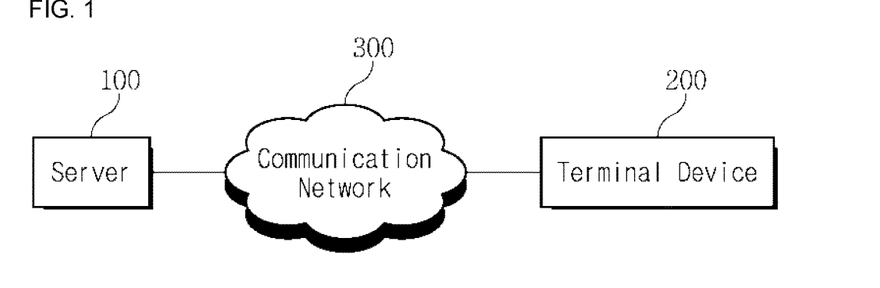
FIG. 1 is a schematic diagram illustrating a system for providing position information by using voice information or image information according to an embodiment of the present disclosure.

FIG. 1 is a schematic diagram illustrating a system for providing position information by using voice information or image information according to an embodiment of the present disclosure.

Referring to FIG. 1, the system for providing position information by using voice information or image information according to an embodiment of the present disclosure may be configured to include a server 100 and a terminal device 200 which are connected through a communication network 300.

The server 100 is a service provider's device that provides information about a user's current position by using voice information or image information, and the terminal device 200 is a user's device that displays a map indicating the user's current position.

Specifically, the terminal device 200 according to an embodiment of the present disclosure communicates with the server 100 via the communication network 300 to transmit and receive data for providing information about a user's current position.

The server 100 and the terminal device 200 each has one or more processors equipped therein. This processor may process program instructions for executing a method according to the present disclosure and thereby perform particular functions of the present disclosure to be described below. This processor may be a single-threaded processor in one embodiment and a multi-threaded processor in another embodiment. Further, this processor may process commands or instructions stored in a memory or storage.

The communication network 300 performs a function to transfer data and exchange information between the server 100 and the terminal device 200.

The communication network 300 may use various forms of communication networks, for example, wireless communication schemes such as WLAN (Wireless LAN), Wi-Fi, Wibro, Wimax, and HSDPA (High Speed Downlink Packet Access), or wired communication schemes such as Ethernet, xDSL (ADSL, VDSL), HFC (Hybrid Fiber Coaxial cable), FTTC (Fiber to the Curb), and FTTH (Fiber to the Home).

The communication network 300 is not limited to the above examples and may use any other communication scheme well known in the art or to be developed.

The terminal device 200 refers to a user's device capable of transmitting and receiving various kinds of data via the communication network 300 in response to user's manipulations. The terminal device 200 may be a smart phone. However, any kind of mobile device having a voice input function, a communication function, and a camera function may be used as the terminal device.

For example, the terminal device 200 may be a tablet PC, a laptop, a PDA (Personal Digital Assistant), a mobile communication terminal, or the like. Besides, any other device commercialized currently or to be developed may be employed as the terminal device.

Additionally, the terminal device 200 performs voice or data communication using the communication network 300, and includes a memory for storing a browser, program and protocol for communication with the server 100 via the communication network 300, and a microprocessor for executing, operating and controlling various kinds of programs.

Detailed operations of the server 100 and the terminal device 200 will be described hereinafter together with a position providing apparatus of FIG. 2.

Figure 2:
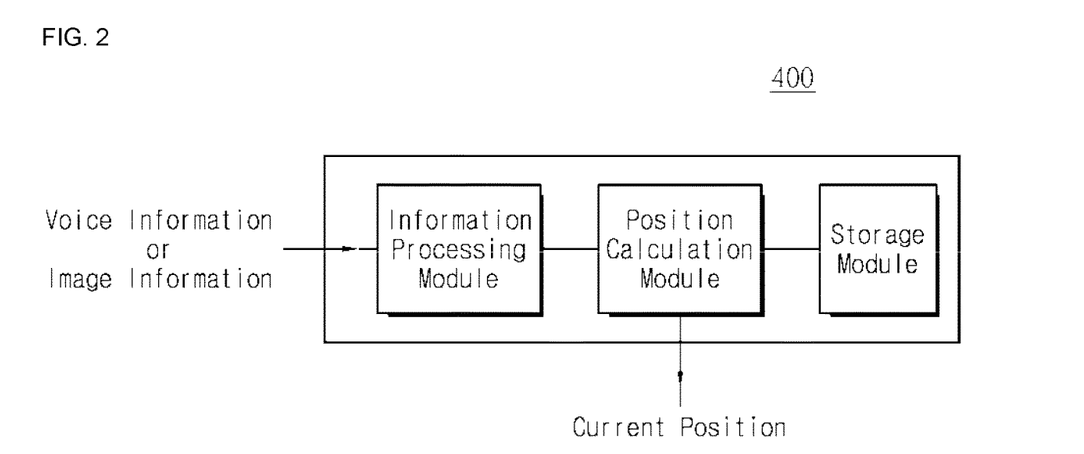
FIG. 2 is a diagram illustrating a position providing apparatus based on voice information or image information according to an embodiment of the present disclosure.

FIG. 2 is a diagram illustrating a position providing apparatus based on voice information or image information according to an embodiment of the present disclosure.

Referring to FIG. 2, the position providing apparatus 400 based on voice information or image information according to an embodiment of the present disclosure may be configured to include an information processing module 410, a position calculation module 420, and a storage module 430.

The position providing apparatus 400 is a device that receives voice information or image information from the user, analyzes the acquired information, and provides current position information to the user. The position providing apparatus 400 may be implemented by software or hardware and installed in the server 100 or the terminal device 200.

When the position providing apparatus 400 is installed in the server 100 according to one embodiment of the present disclosure, the server 100 controls a process of calculating a user's current position. The calculated current position is offered to the terminal device 200 through communication between the server 100 and the terminal device 200.

According to another embodiment of the present disclosure, the terminal device 200 may control the position calculation process. In this case, the position providing apparatus 400 may be installed previously as default in the terminal device 200 or downloaded from the server 100 to the terminal device 200.

In order to calculate a current position of the user of the terminal device 200 through the position providing apparatus 400, required first is that the information processing module 410 receives voice information or image information about a plurality of buildings or facilities from the terminal device 200.

The plurality of buildings or facilities may be outdoor buildings or indoor facilities such as a store, a fountain, an escalator, or the like.

In one embodiment of the present disclosure, the voice information refers to information about a plurality of buildings or facilities which is entered in a voice from the user through the terminal device 200. For example, the voice information may be a vocal expression of a facility's name or store's brand name.

In another embodiment of the present disclosure, the image information refers to information about a plurality of buildings or facilities which is captured as an image by the terminal device 200. For example, the image information may denote a photographic image that contains an outward appearance, signboard, brand name, logo, mark, etc. of a facility.

The image information may be a single image obtained when the user takes a picture of a plurality of buildings or facilities at once, or two or more images obtained when the user located at a certain place takes pictures of respective buildings or facilities which reside in a user's view.

Contrary to the voice information, the image information may include information about a photographing direction.

In an embodiment of the present disclosure, an indoor place such as a complex shopping center is described by way of example. The present disclosure is, however, not limited to such indoor places.

Through the terminal device 200, the user inputs, in the form of voice or image, information about a plurality of buildings or facilities which exist in his or her view at a current place. This information is transmitted to the information processing module 410 of the position providing apparatus 400.

For example, if there are 'escalator', 'xxx coffee shop', and 'yyy clothing store' within the range of view at the user's current position, information inputted into the terminal device 200 in one embodiment of the present disclosure is a user's voice that the user utters a facility name (i.e., escalator), a coffee shop name (i.e., xxx), and a clothing brand name (i.e., yyy).

Information inputted into the terminal device 200 in another embodiment of the present disclosure is a photographic image captured to contain an outward appearance of the escalator and signboards (or brand names, logos, etc.) of the coffee shop and the clothing store.

When the voice or image information inputted into the terminal device 200 is transmitted to the information processing module 410, the information processing module 410 extracts identification information of a plurality of buildings or facilities from the voice or image information.

In the above example, the information processing module 410 according to one embodiment of the present disclosure extracts 'escalator', which is a facility name, and 'xxx' and 'yyy', which are brand names of a coffee shop and a clothing store, from the voice information through a voice signal analysis.

The voice information is converted into text such as 'escalator', 'xxx', and 'yyy'. This conversion may be performed through various voice recognition and conversion techniques well known in the art.

According to another embodiment of the present disclosure, the information processing module 410 that receives the image information extracts the above-mentioned identification information through a similar image analysis for a brand logo or facility appearance and through a text analysis for a brand name. This extraction of identification information from the image information may be performed through a well-known image processing technique.

In addition, when the information processing module 410 receives the image information, the image information may also include information about a photographing direction.

The position calculation module 420 according to an embodiment of the present disclosure performs the overall control of the position providing apparatus 400. In particular, the position calculation module 420 calculates a user's current position on a map database by using the identification information extracted from the voice information or the image information, and then associates and indicates the calculated current position with and on the stored map database.

Specifically, the position calculation module 420 according to an embodiment of the present disclosure acquires location information of the plurality of buildings or facilities from the map database, based on the extracted identification information. Then, from the acquired location information, the position calculation module 420 calculates a user's current position by considering a positional relationship between the user and each of the plurality of buildings or facilities.

The acquired location information of the plurality of buildings or facilities may be represented by an address or latitude/longitude coordinates of each building or facility.

Considering the positional relationship between the user and each building or facility means finding a user's current position that allows all the identified buildings or facilities to exist within the range of view of the user.

That is, from the map database stored in the storage module 430, the position calculation module 420 determines a user's current position by considering all of the identification information of each building or facility, the location information of each building or facility, and the positional relationship between the user and each building or facility.

In case where the position providing apparatus 400 receives the voice information in one embodiment, the position calculation module 420 determines a user's current position by considering the identification information extracted from the voice information, the location information obtained from the map database based on the identification information, and the positional relationship between the user and each building or facility.

That is, in the above example, after the identification information such as 'escalator', 'xxx' and 'yyy' is extracted, and the location information (address or latitude/longitude coordinates) of 'the escalator', 'the xxx coffee shop' and 'the yyy clothing store' is acquired from the stored map database, based on the extracted identification information. Then considering the positional relationship with the user, a specific position that allows all of 'the escalator', 'the xxx coffee shop' and 'the yyy clothing store' to exist within the range of view of the user is found on the map database. As a result, the specific position is determined as the user's current position.

In case where the position providing apparatus 400 receives the image information in another embodiment, the position calculation module 420 further considers a photographing direction in which a photographic image is captured, in addition to considering the identification information extracted from the image information, the location information obtained from the map database based on the identification information, and the positional relationship between the user and each building or facility.

That is, in the above example, when considering the positional relationship with the user, a photographing direction indicating, for example, that 'the xxx coffee shop' is at 15 degrees east or west from a current place may be further considered. Thus, this case may further increase the positioning accuracy than in case of calculating the user position by using the voice information.

Also, the position calculation module 420 associates (i.e., mapping) the calculated current position with the stored map database. That is, the user's current position is indicated on the map database and displayed through the terminal device 200.

The storage module 430 is an element for storing data and programs required for functional operations of the position providing apparatus 400. The storage module 430 may include a program region and a data region. In particular, the storage module 430 according to an embodiment of the present disclosure stores the map database including a mapping relationship between the identification information and the location information with respect to the plurality of buildings or facilities.

The position providing apparatus 400 may be implemented in software or hardware and installed in the server 100 or the terminal device 200 as described above. When the position providing apparatus 400 is installed in the server 100, the position providing service requires communication between the server 100 and the terminal device 200 through the communication network 300. When the position providing apparatus 400 is installed in the terminal device 200, the position providing service may be performed by the terminal device 200 alone.

That is, when the position providing apparatus 400 is installed in the server 100 according to one embodiment of the present disclosure, voice or image information about a plurality of buildings or facilities is acquired by the terminal device 200 and transmitted to the server 100. Then, in the server 100, the position providing apparatus 400 analyzes the received information, extracts the identification information, calculates the user's current position, and then associates and indicates the current position with and on the stored map database. Thereafter, a map indicating the user's current position is transmitted to and displayed on the terminal device 200.

When the position providing apparatus 400 is installed previously as default in the terminal device 200 or downloaded from the server 100 to the terminal device 200 according to another embodiment of the present disclosure, all the above-described operations of the position providing apparatus 400 are performed in the terminal device 200, and a resultant map is displayed on the terminal device 200.

As described hereinbefore, the position providing apparatus 400, whether it is installed in either the server 100 or the terminal device 200, can allow the user of the terminal device 200 to easily find his or her current position from a map displayed on the terminal device 200.

Hereinafter, each of the server 100 and the terminal device 200 for providing position information by using voice information or image information according to an embodiment of the present disclosure will be described with reference to FIGS. 3 and 4.

Figure 3:
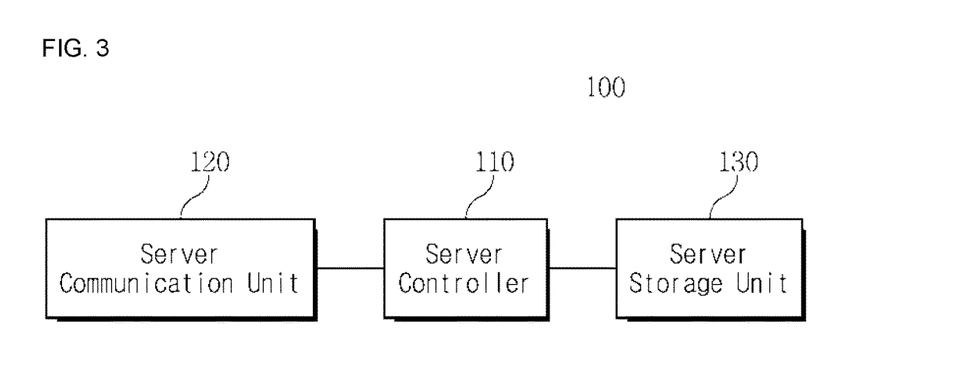
FIG. 3 is a diagram illustrating a server for providing position information by using voice information or image information according to an embodiment of the present disclosure.

FIG. 3 is a diagram illustrating a server for providing position information by using voice information or image information according to an embodiment of the present disclosure.

Referring to FIG. 3, the server 100 includes a server controller 110, a server communication unit 120, and a server storage unit 130.

The server communication unit 120 is configured to communicate with the terminal device 200 through the communication network 300 to transmit and receive data for providing information about a user's current position.

The server storage unit 130 is configured to store all programs for providing information about a user's current position and, in particular, store the position providing apparatus 400 implemented in software. Alternatively, when the position providing apparatus 400 is implemented in hardware, it may exist as a separate element in the server 100.

The server controller 110 is configured to control the execution of the position providing apparatus 400 stored in the server storage unit 130 or separately existing in the server 100.

According to one embodiment of the present disclosure in which the position providing apparatus 400 is installed in the server 100, the server controller 110 controls a process of calculating the current position through the position providing apparatus 400 and a process of transmitting a map indicating the calculated current position to the terminal device 200.

That is, the server controller 110 controls the server communication unit 120 to receive the voice or image information about a plurality of buildings or facilities from the terminal device 200, and also controls the position providing apparatus 400 to extract the identification information (e.g., names, brand names, or any other identifiers) of the plurality of buildings or facilities from the voice or image information and to acquire the location information (e.g., addresses or latitude/longitude coordinates) of the plurality of buildings or facilities from the map database, based on the extracted identification information.

In addition, the server controller 110 controls the position providing apparatus 400 to calculate the user's current position by considering the acquired location information and a positional relationship with the user and to associate and indicate the calculated current position with and on the map database. Also, the server controller 110 controls the server communication unit 120 to transmit a resultant map indicating the user's current position to the terminal device 200.

Further, if the server 100 receives the image information from the terminal device 200, the server controller 110 controls the position providing apparatus 400 to calculate the current position by further considering the acquired photographing direction information.

Although the present disclosure describes exemplary device configurations, the functional operations and the subject matter described herein may be implemented with other types of digital electronic circuitry, or implemented using software, firmware, hardware, or any combination thereof including the structures disclosed herein and their structural equivalents. The subject matter described herein may be implemented as one or more modules associated with computer program instructions encoded on at least one computer program product, i.e., at least one non-transitory computer-readable recording medium to control or execute the operations of the apparatus according to the disclosure. The computer-readable medium may be a machine-readable storage device, a machine-readable storage board, a memory device, a composition of matter that affects a machine-readable propagation-type signal, or any combination thereof.

Figure 4:
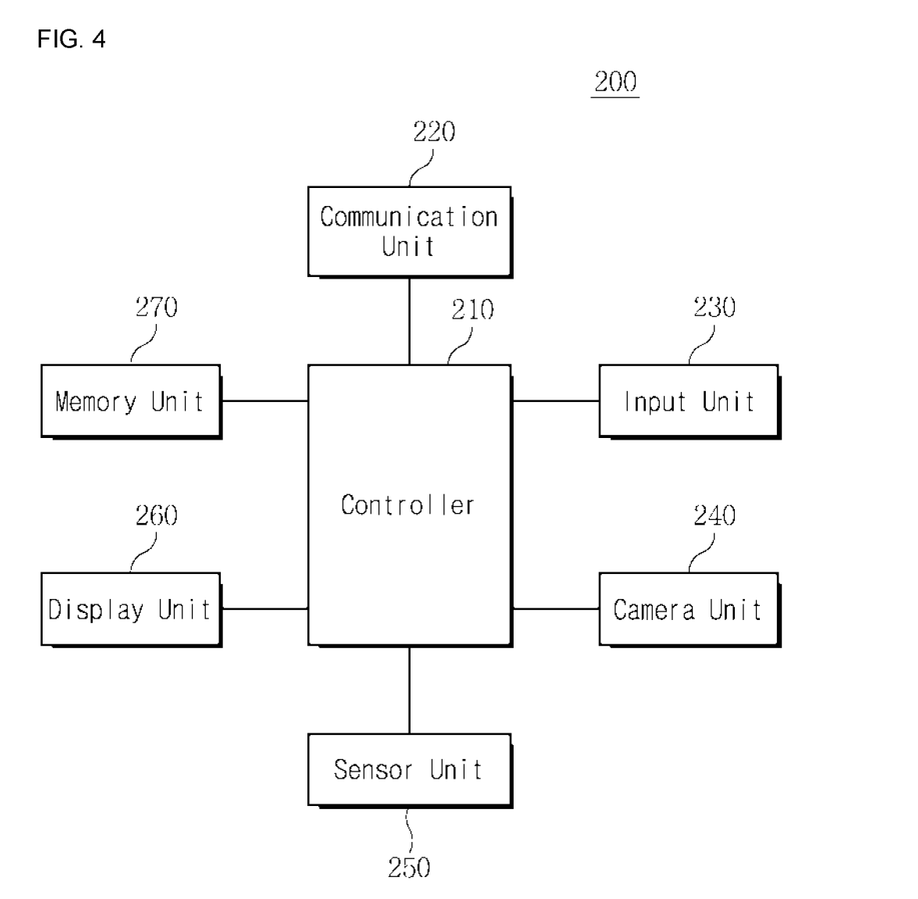
FIG. 4 is a diagram illustrating a terminal device for providing position information by using voice information or image information according to an embodiment of the present disclosure.

FIG. 4 is a diagram illustrating a terminal device for providing position information by using voice information or image information according to an embodiment of the present disclosure.

Referring to FIG. 4, the terminal device 200 includes a controller 210, a communication unit 220, an input unit 230, a camera unit 240, a sensor unit 250, a display unit 260, and a memory unit 270.

The controller 210 may be a processor capable of operating an operation system (OS) and the respective elements listed above.

Contrary to one embodiment in which the position providing apparatus 400 is installed in the server 100, in another embodiment the position providing apparatus 400 is installed previously as default in the terminal device 200 or downloaded from the server 100 to the terminal device 200. Depending on both embodiments, the function of the controller 210 may be varied in part.

In one embodiment, the controller 210 controls the communication unit 220 to transmit voice or image information about a plurality of buildings or facilities to the server 100. The voice information is acquired through the input unit 230, and the image information is acquired through the camera unit 240. Also, the controller 210 controls the communication unit 220 to receive a map indicating a user's current position from the server 100 and then controls the display unit 260 to display the received map.

In another embodiment, the controller 210 controls the communication unit 220 to download the position providing apparatus 400 from the server 100 and then controls the memory unit 270 to store the downloaded apparatus 400. Also, the controller 210 controls the position providing apparatus 400 to perform the entire process of calculating a user's current position.

The communication unit 220 is configured to perform a function of communicating with the server 100 through the communication network 300 to transmit and receive data for providing information about a user's current position.

The communication unit 220 may include at least one of a wireless communication module (not shown) and a wired communication module (not shown).

The wireless communication module is configured to transmit and receive data, based on a selected wireless communication scheme. Using one of a radio network communication module, a WLAN communication module, and a WPAN communication module, the terminal device 200 may transmit or receive data to or from the server 100.

The wired communication module is configured to transmit and receive data, based on a selected wired communication scheme. The wired communication module may access the communication network 300 through a wire and then transmit or receive data to or from the server 100.

The input unit 230 is configured to receive a user's manipulation for entering various kinds of information or controlling various functions of the terminal device 200, to create a corresponding input signal, and to deliver the input signal to the controller 210 or the server 100.

The input unit 230 may include a keypad and/or a touch pad. Also, the input unit 230 formed of a touch panel may be integrated with the display unit 260 formed of a display panel to constitute a touch screen.

The input unit 230 may use various input mechanisms such as a keyboard, a mouse, a joystick, a jog wheel, a touch-sensitive unit, a gesture or image detection unit, a voice recognition unit, and the like.

In particular, the input unit 230 may receive voice information. That is, when the user utters information about a plurality of buildings or facilities, the input unit 230 receives user's utterance as the voice information.

For example, if there are 'escalator', 'xxx coffee shop', and 'yyy clothing store' within the range of view of the user at a user's place, a user's voice that the user utters a facility name (i.e., escalator), a coffee shop name, and a clothing brand name may be received as the voice information.

The camera unit 240 is configured to take a photograph of a plurality of buildings or facilities. Using the camera unit 240, the user may take a picture once so that a single image contains all the plurality of buildings or facilities residing within a user's view. Alternatively, the user may take pictures several times while varying photographing directions.

In the above example, a photographic image captured to contain an outward appearance of the escalator and signboards (or brand names, logos, etc.) of the xxx coffee shop and the yyy clothing store may be received as the image information.

A single image that contains all of the escalator, the coffee shop, and the clothing store may be obtained. Alternatively, at a fixed place, three different images each focusing on each of the escalator, the coffee shop, and the clothing store may be obtained.

The sensor unit 250 is configured to detect an orientation of the terminal device 200. In an embodiment, the sensor unit 250 is used to detect a photographing direction from the orientation of the terminal device 200.

Since the photographing direction that indicates, for example, which direction the escalator is located from a user's place can be further considered through the sensor unit 250, it is possible to further increase the positioning accuracy than in case of calculating the user position by using the voice information.

The photographing direction information obtained through the sensor unit 250 is considered at the time of position calculation using the image information.

The display unit 260 is configured to display information about operating states and results of the terminal device 200.

Also, the display unit 260 may display a menu of the terminal device 200 and user data entered by the user.

The display unit 260 may be formed of LCD (Liquid Crystal Display), TFT-LCD (Thin Film Transistor LCD), LED (Light Emitting Diode), OLED (Organic LED), AMOLED (Active Matrix OLED), retina display, flexible display, 3-dimensional display, or the like. In case where the display unit 260 is formed of a touch screen, the display unit 260 may perform all or parts of functions of the input unit 230.

Specifically, in an embodiment of the present disclosure, under the control of the controller 210, the display unit 260 may display a map that indicates a user's current position. As described above, the map may be provided from the position providing apparatus 400 equipped in the server 100 or the terminal device 200.

Through the display unit 260, the user can easily find his or her current position on the map.

The memory unit 270 includes a main memory and an auxiliary memory. The memory unit 270 is configured to store programs required for the operation of the terminal device 200 and also store related data.

The memory unit 270 may include a program region and a data region.

In particular, the memory unit 270 stores an operating system for booting the terminal device 200 and, in particular, may store the position providing apparatus 400 implemented in software. Alternatively, when the position providing apparatus 400 is implemented in hardware, it may exist as a separate element in the terminal device 200.

Figure 5:
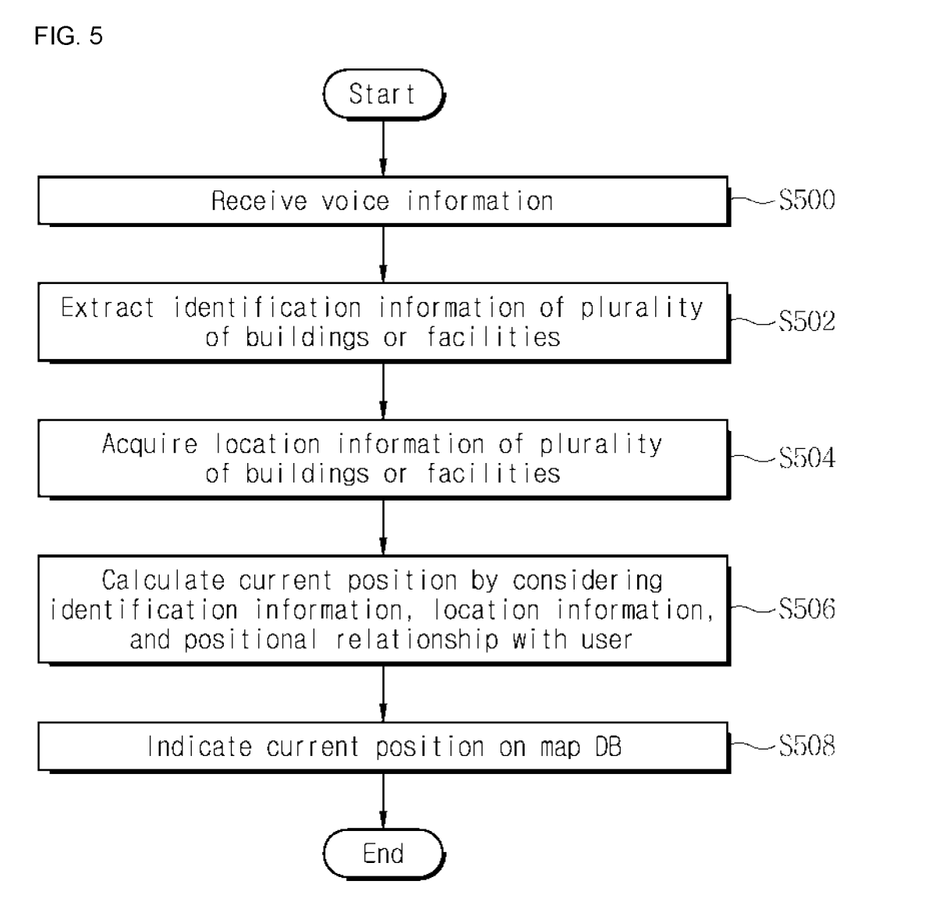
FIG. 5 is a flow diagram illustrating a position providing method using voice information at a position providing apparatus according to one embodiment of the present disclosure.

FIG. 5 is a flow diagram illustrating a position providing method using voice information at a position providing apparatus according to one embodiment of the present disclosure.

Referring to FIG. 5, the position providing apparatus 400 receives voice information about a plurality of buildings or facilities from the terminal device 200 at step S500. In the above-discussed example, a user's voice that the user utters a facility name 'escalator' and brand names 'xxx coffee shop' and 'yyy clothing store' is received as the voice information.

At step S502, the position providing apparatus 400 extracts identification information of the plurality of buildings or facilities from the received voice information through a voice analysis technique. In the above example, the identification information such as 'escalator', 'xxx' and 'yyy' is extracted.

At step S504, the position providing apparatus 400 acquires location information of the plurality of buildings or facilities from a map database by using the extracted identification information. The location information may be an address or latitude/longitude coordinates of each building or facility.

At step S506, the position providing apparatus 400 calculates the current position of the user on the map database by considering the acquired location information and a positional relationship between the user and each building or facility.

That is, in the above example, finding a specific position that allows all the identified facilities 'escalator', 'xxx coffee shop', and 'yyy clothing store' to exist within the range of view of the user, this found position is determined as the user's current position.

At step S508, the position providing apparatus 400 associates (i.e., mapping) and indicates the calculated current position with and on the map database. Then the map database or a map indicating the current position is offered to the terminal device 200 to be displayed.

This process of calculating the user's current position by using the voice information at the position providing apparatus 400 may be performed in the server 100 or the terminal device 200.

Figure 6:
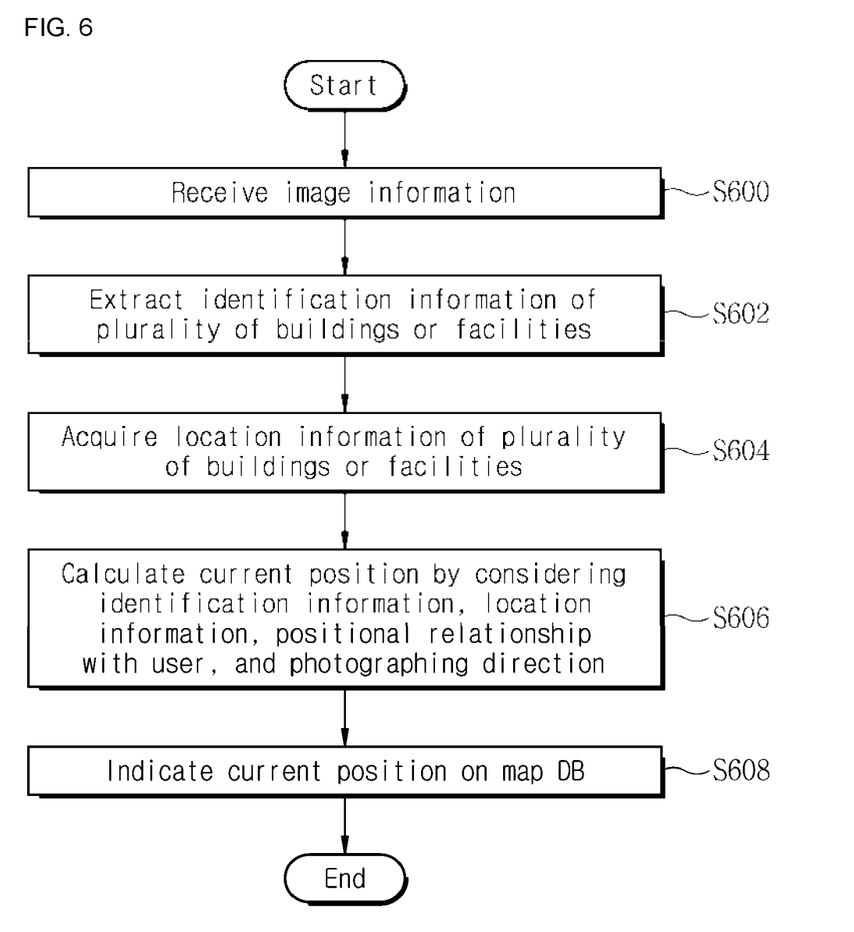
FIG. 6 is a flow diagram illustrating a position providing method using image information at a position providing apparatus according to another embodiment of the present disclosure.

FIG. 6 is a flow diagram illustrating a position providing method using image information at a position providing apparatus according to another embodiment of the present disclosure.

Referring to FIG. 6, the position providing apparatus 400 receives image information about a plurality of buildings or facilities from the terminal device 200 at step S600.

In the above-discussed example that three facilities 'escalator', 'xxx coffee shop' and 'yyy clothing store' are seen at a user's place, a photographic image captured to contain an outward appearance of the escalator and signboards (or brand names, logos, etc.) of the xxx coffee shop and the yyy clothing store is received as the image information.

The received photographic image may be a single image that contains all of the escalator, the coffee shop, and the clothing store, or may be three different images having different photographing directions toward the respective facilities.

At step S602, the position providing apparatus 400 extracts identification information of the plurality of buildings or facilities from the received image information through a similar image analysis for a brand logo or facility appearance and through a text analysis for a brand name.

That is, in the above example, the appearance of a facility is recognized as 'escalator' through the image analysis, and brand names 'xxx' and 'yyy' are extracted from signboards through the text analysis.

At step S604, the position providing apparatus 400 acquires location information of the plurality of buildings or facilities from a map database by using the extracted identification information. The location information may be an address or latitude/longitude coordinates of each building or facility.

At step S606, the position providing apparatus 400 calculates the current position of the user on the map database by considering the acquired location information and a positional relationship between the user and each building or facility and further considering photographing direction information of the image.

That is, in the above example, when finding a specific position that allows all the identified facilities to exist within the range of view of the user on the map database, a photographing direction obtained through the sensor unit 250 of the terminal device 200 is further considered. For example, the position providing apparatus 400 may consider which side of the escalator the user is in and which direction from the coffee shop the user is in.

Therefore, compared to one embodiment using only the voice information to calculate the user's current position, this embodiment may enhance the accuracy of the user's current position.

At step S608, the position providing apparatus 400 associates (i.e., mapping) and indicates the calculated current position with and on the map database. Then the map database or a map indicating the current position is offered to the terminal device 200 to be displayed such that the user can easily find his or her current position.

Figure 7:
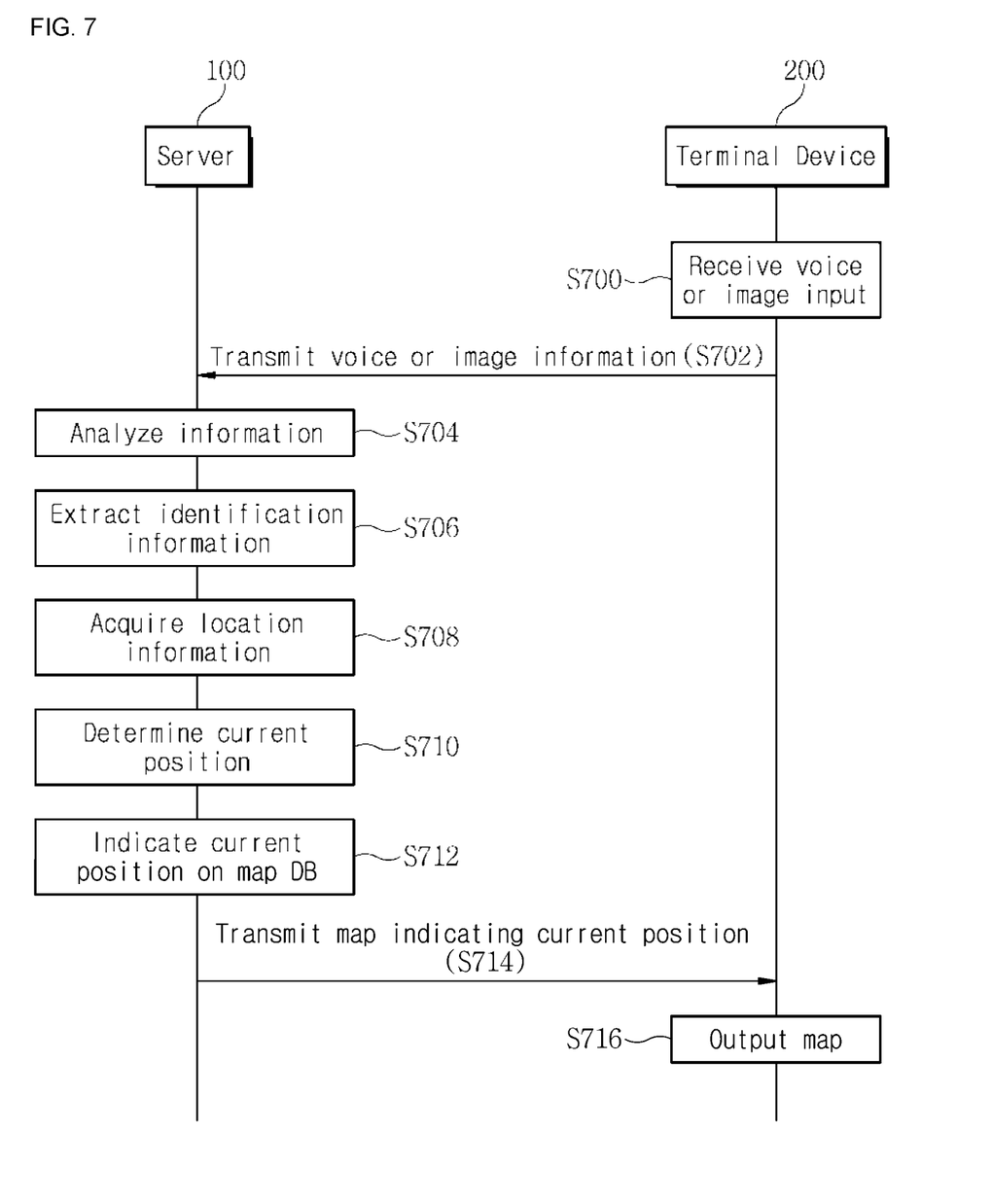
FIG. 7 is a flow diagram illustrating a position providing method using voice information or image information at a server having a position providing apparatus installed therein according to one embodiment of the present disclosure.

FIG. 7 is a flow diagram illustrating a position providing method using voice information or image information at a server having a position providing apparatus installed therein according to one embodiment of the present disclosure.

Referring to FIG. 7, the position providing apparatus 400 is installed in the server 100, and therefore a current position of a user of the terminal device 200 is calculated through communication between the server 100 and the terminal device 200.

At step S700, the terminal device 200 receives an input of voice or image information about a plurality of buildings or facilities which exist within the range of view of the user at a user's current position.

At step S702, the terminal device 200 transmits the received voice or image information to the server 100 for position calculation.

At this time, if the information being transmitted is the image information, it may include information about a photographing direction of a captured image.

Then, the position providing apparatus 400 installed in the server 100 calculates a user's current position by analyzing the voice or image information.

Specifically, the position providing apparatus 400 analyzes the voice or image information through various voice analysis or image processing techniques at step S704 and extracts identification information of the plurality of buildings or facilities from the analyzed information at step S706. The identification information refers to a name, brand name, logo, or any other identifier of each building, facility, or signboard thereof residing within the range of view of the user.

At step S708, the position providing apparatus 400 acquires location information of the plurality of buildings or facilities from a map database by using the extracted identification information. The location information refers to an address or latitude/longitude coordinates of each building or facility.

At step S710, the position providing apparatus 400 determines the user's current position by using the acquired location information and finding a specific position that allows the identified buildings or facilities to exist within the range of view on the map database.

In case of using the image information, the photographing direction information is further considered. Therefore, a direction from the user to the identified buildings or facilities is further used to determine the user's current position with higher accuracy.

The position providing apparatus 400 associates (i.e., mapping) and indicates the calculated current position with and on the map database at step S712, and transmits a map indicating the user's current position to the terminal device 200 at step S714.

The terminal device 200 outputs the received map through the display unit 260 at step S716, so that the user can easily find his or her position through the terminal device 200.

Figure 8:
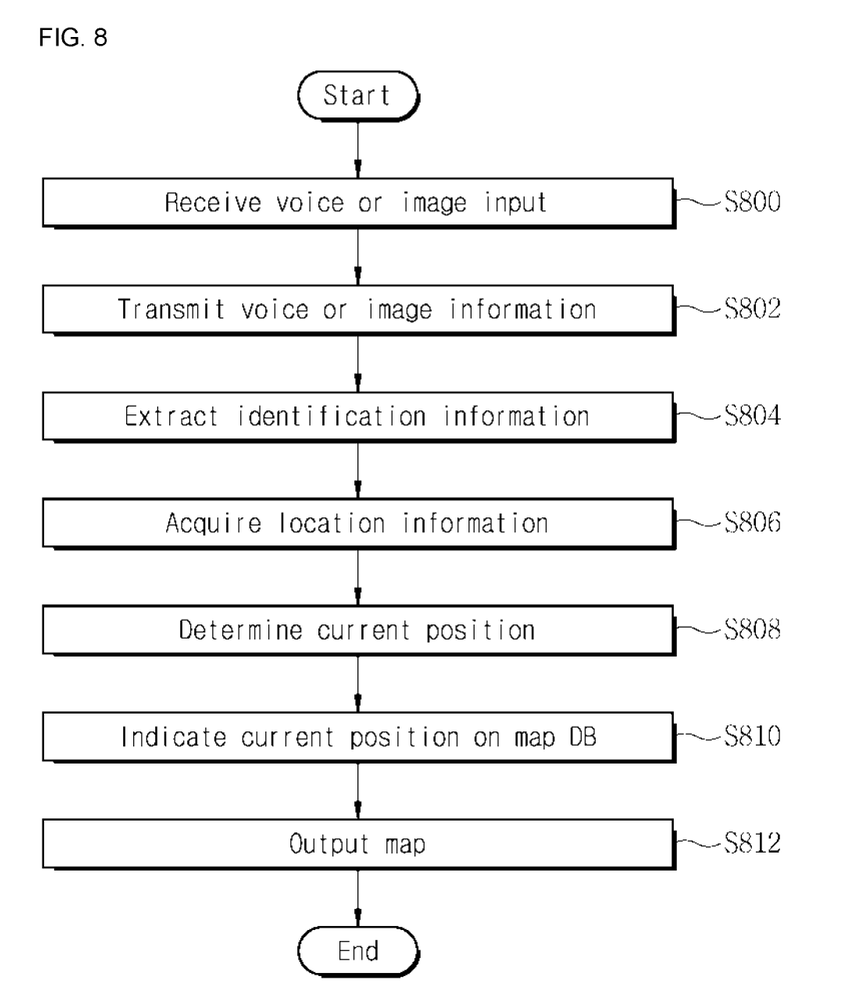
FIG. 8 is a flow diagram illustrating a position providing method using voice information or image information at a terminal device having a position providing apparatus installed therein according to another embodiment of the present disclosure.

FIG. 8 is a flow diagram illustrating a position providing method using voice information or image information at a terminal device having a position providing apparatus installed therein according to another embodiment of the present disclosure.

Referring to FIG. 8, the position providing apparatus 400 may be installed in the terminal device 200 in the form of software or hardware or downloaded from the server 100 to the terminal device 200 in the form of software. Thus, the terminal device 200 controls the overall process of position calculation.

At step S800, the terminal device 200 receives, through the input unit 230 or the camera unit 240, an input of voice or image information about a plurality of buildings or facilities which exist within the range of view of the user at a user's current position.

Then, the terminal device 200 extracts identification information of the plurality of buildings or facilities through the analysis of the voice or image information using various voice analysis or image processing techniques at steps S802 and S804, and acquires location information of the plurality of buildings or facilities from a map database by using the extracted identification information at step S806.

At step S808, the terminal device 200 determines the user's current position by using the acquired location information and finding a specific position that allows the identified buildings or facilities to exist within the range of view on the map database. In case of using the image information, the photographing direction information is further considered, and the accuracy of the current position is improved.

The terminal device 200 associates (i.e., mapping) and indicates the calculated current position with and on the map database at step S810, and outputs a map through the display unit 260 at step S812.

Figure 9:
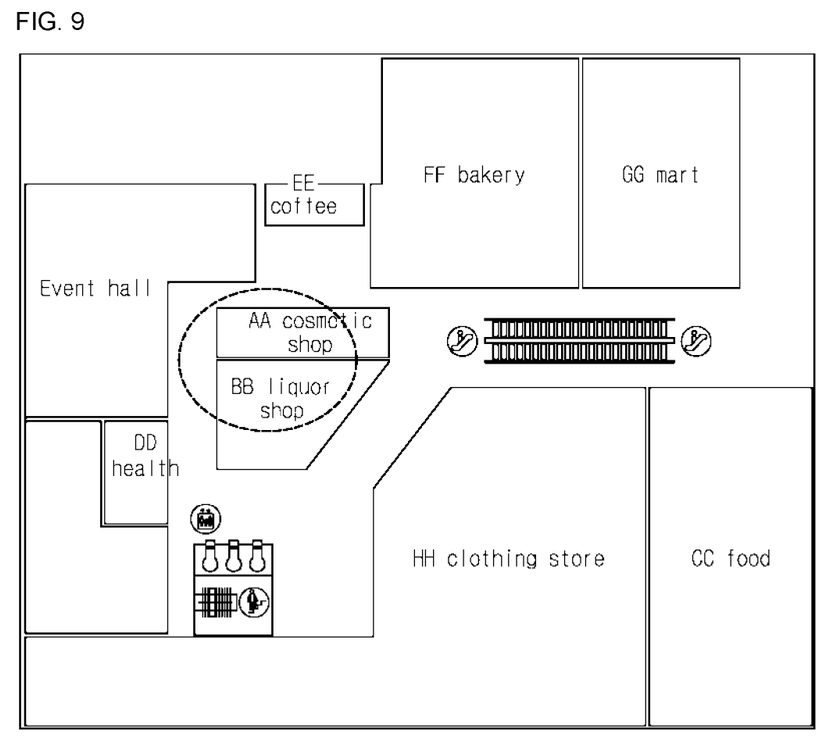
FIG. 9 is an exemplary view showing a map database that is provided through a terminal device and indicates a user's current position calculated according to an embodiment of the present disclosure.

FIG. 9 is an exemplary view showing a map database that is provided through a terminal device and indicates a user's current position calculated according to an embodiment of the present disclosure.

Referring to FIG. 9, the user of the terminal device 200 is located roughly within a circle indicated by a dotted line.

If the user wishes to go to 'CC food' from a current place, the user first needs to know his or her current position.

At this time, buildings or facilities existing within the range of view of the user are 'AA cosmetic shop' and 'BB liquor shop', for example. Then, the user speaks the names of these shops into the terminal device 200 or takes a picture of signboards of these shops through the terminal device 200. This is entered as voice or image information in the terminal device 200.

The position providing apparatus 400 in the server 100 or the terminal device 200 analyzes the voice or image information, extracts the identification information of 'AA cosmetic shop' and 'BB liquor shop', and acquires the location information corresponding to the identification information.

Then, by considering the identification information, the location information, and a positional relationship with the user, the position providing apparatus 400 finds a specific position that allows all the identified facilities to exist within the range of view on the map database. This found position is determined as the user's current position.

In the above example, a specific position that allows both 'AA cosmetic shop' and 'BB liquor shop' to exist with the range of view is found on the map database and determined as the user's current position. Then the determined position is associated with and indicated on the map database.

A resultant map is outputted through the display unit 260 of the terminal device 200 and thereby provided to the user.

If the image information is used, information about a photographing direction at capturing an image by the terminal device 200 is also considered. Therefore, in this case, the accuracy of the user's current position is higher than in case of using the voice information.

Figure 10:
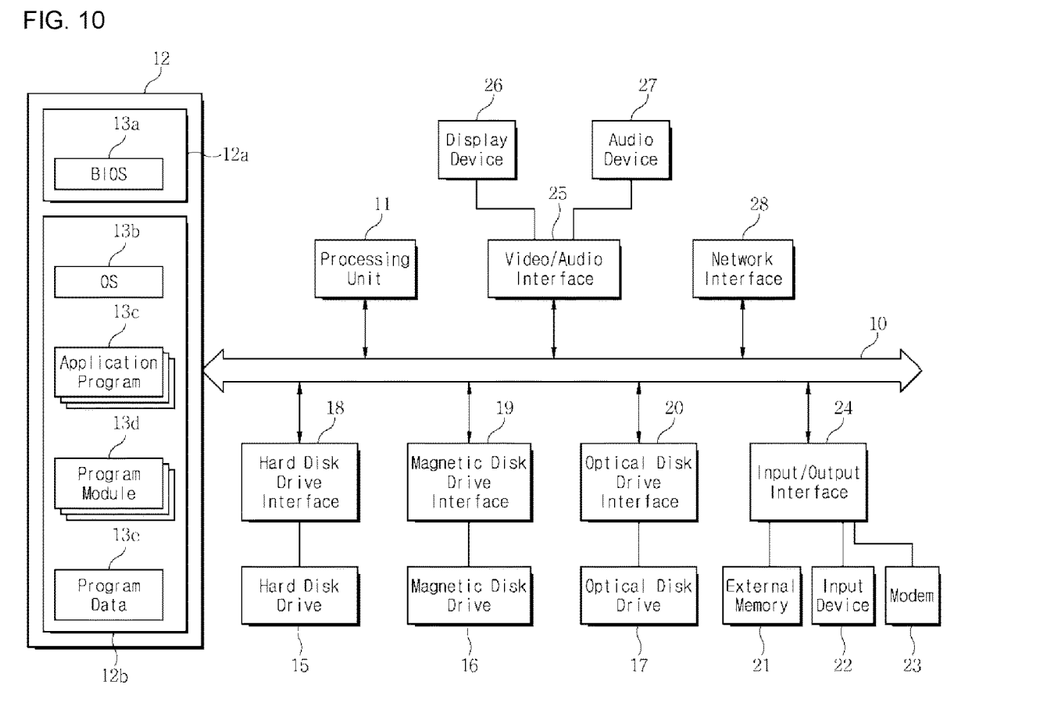
FIG. 10 is a diagram illustrating an operating environment of an apparatus for a position providing method according to an embodiment of the present disclosure.

FIG. 10 is a diagram illustrating an operating environment of an apparatus for a position providing method according to an embodiment of the present disclosure.

FIG. 10 and the following discussion are intended to provide a brief, general description of a suitable computing environment in which the disclosure may be implemented. Although not required (e.g., when implemented in hardware), the disclosure will be described in the general context of computer-executable instructions, such as program modules, being executed by computer systems.

Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

Referring to FIG. 10, an exemplary computing system for implementing the disclosure includes a processing unit 11, a system memory 12, and a system bus 10 that couples various system components including the system memory 12 to the processing unit 11.

The processing unit 11 can execute computer-executable instructions designed to implement features of this disclosure.

The system bus 10 may be any of several, types of bus structures including a memory bus or memory controller, a peripheral bus, and a local bus using any of a variety of bus architectures.

The system memory 12 includes read only memory (ROM) 12a and random access memory (RAM) 12b. A basic input/output system (BIOS) 13a, containing the basic routines that help transfer information between elements within computer system, such as during start-up, may be stored in the ROM 12a.

The computing system may also include a storage unit, e.g., a hard disk drive 15 for reading from and writing to a hard disk, a magnetic disk drive 16 for reading from or writing to a magnetic disk, and an optical disk drive 17 for reading from or writing to an optical disk such as a CD-ROM or other optical media.

The hard disk drive 15, the magnetic disk drive 16, and the optical disk drive 17 are connected to the system bus 10 by a hard disk drive interface 18, a magnetic disk drive-interface 19, and an optical drive interface 20, respectively.

Additionally, the computing system may further include an external memory 21 as the storage unit. The external memory 21 may be connected to the system bus 10 through an input/output interface 24.

The drives and their associated computer-readable media provide nonvolatile storage of computer-executable instructions, data structures, program modules, and other data for the computing system.

Although the example environment described herein employs the hard disk 15, the magnetic disk 16 and the optical disk 17, other types of computer readable media for storing data can be used, including magnetic cassettes, flash memory cards, digital versatile disks, Bernoulli cartridges, RAMs, ROMs, and the like.

Program code means including one or more program modules, loaded and executed by the processing unit 11, such as an operating system 13b, one or more application programs 13c, other program modules 13d, and program data 13e, may be stored in the hard disk 15, the magnetic disk 16, the optical disk 17, the ROM 12a, or the RAM 12b. The position providing method of the present disclosure may be implemented as a program module, stored in at least one of the hard disk 15, the magnetic disk 16, the optical disk 17, the ROM 12a, or the RAM 12b, and then loaded and executed by the processing unit 11.

A user may enter commands and information into the computing system through other input device 22 such as a keyboard, a pointing device, a microphone, a joy stick, a game pad, or the like.

This other input device 22 can be connected to the processing unit 11 through the input/output interface 24 coupled to the system bus 10. The input/output interface 24 may logically represent any of a wide variety of different interfaces, such as, for example, a serial port interface, a PS/2 interface, a parallel port interface, a universal serial bus (USB) interface, or an institute of electrical and electronics engineers (IEEE) 1394 interface (i.e., a FireWire interface), or may even logically represent a combination of different interfaces.

Additionally, the computing system may further include a display device 26 such as a monitor or LCD and/or an audio device 27 such as a speaker or a microphone, which are connected to the system bus 10 via a video/audio interface 25. The video/audio interface 25 may include high definition multimedia interface (HDMI), graphics device interface (GDI), or the like.

The computing system is connectable to networks, such as, for example, an office-wide or enterprise-wide computer network, a home network, an intranet, and/or the Internet. The computing system can exchange data with external sources, such as, for example, remote computer systems, remote applications, and/or remote databases over such networks.

The computing system includes a network interface 28, through which the computing system receives data from external sources and/or transmits data to external sources.

The network interface 28 facilitates the exchange of data with remote devices.

For example, if the computing system is the server 100, the server 100 may transmit or receive information to or from the terminal device 200 through the network interface 28. If the computing system is the terminal device 200, the terminal device 200 may transmit or receive information to or from the server 100 through the network interface 28.

The network interface 28 can logically represent one or more software and/or hardware modules, such as, for example, a network interface card and corresponding network driver interface specification (NDIS) stack.

Likewise, the computing system receives and/or transmits data from and/or to external sources through the input/output interface 24. The input/output interface 24 is coupled to a modem 23 (e.g., a standard modem, a cable modem, or a digital subscriber line (DSL) modem), through which the computing system receives data from and/or transmits data to external sources.

While FIG. 10 represents a suitable operating environment for the present disclosure, the principles of the present disclosure may be employed in any system that is capable of, with suitable modification if necessary, implementing the principles of the present disclosure.

The environment illustrated in FIG. 10 is illustrative only and by no means represents even a small portion of the wide variety of environments in which the principles of the present disclosure may be implemented.

A program of this disclosure and various kinds of information generated during the execution of the program may be stored in and accessed from any of the computer-readable media associated with the computing system as shown in FIG. 10. For example, portions of such program modules and portions of associated program data may be included in the operating system 13b, the application programs 13c, the program modules 13d and/or the program data 13e, for storage in the system memory 12.

When a mass storage device such as the hard disk is coupled to the computing system, such program modules and associated program data may also be stored in the mass storage device.

In a networked environment, program modules depicted relative to the computing system, or portions thereof, can be stored in a remote computer system connected through the modem 23 or network interface 25 of the input/output interface 24. Execution of such modules may be performed in a distributed environment as previously described.

Process steps may be performed by one or more programmable processors that execute a computer program so as to perform functions by operating on-input data and producing outputs. Additionally, process steps may be also implemented by a specific-purpose logic circuitry such as a field programmable gate array (FPGA) or an application-specific integrated circuit (ASIC), and also devices may be implemented by them.

Processors suitable for processing of computer programs include both a general-purpose microprocessor and a special-purpose microprocessor, and one or more processors of a certain kind of digital computer.

Generally, the processor may receive instructions and data from the read-only memory or the random access memory or both. Elements of the computer may include at least one processor for executing instructions and one or more memory units for storing instructions and data.

In general, the computer may include one or more mass storage devices, e.g., magnetic-optical disks or optical disks, for storing data or may be coupled to them to receive and/or transmit data from and/or to them.

Information carriers suitable for specifying computer program commands and data may include magnetic media such as a hard disk, a floppy disk and a magnetic tape, optical media such as CD-ROM (Compact Disk Read Only Memory) and DVD (Digital Video Disk), magneto-optical media such as a floptical disk, and semiconductor memories such as ROM (Read Only Memory), RAM (Random Access Memory), flash memory, EPROM (Erasable Programmable ROM) and EEPROM (Electrically EPROM).

A processor and memory may be supplemented by a special-purpose logic circuit or integrated therewith.

While the specification contains many specific implementation details, these should not be construed as limitations on the scope of any disclosure or of what may be claimed, but rather as descriptions of features that may be specific to particular embodiments of particular disclosures.

Certain features that are described in the specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Also, although the present specifications describe that operations are performed in a predetermined order with reference to a drawing, it should not be construed that the operations are required to be performed sequentially or in the predetermined order, which is illustrated to obtain a preferable result, or that all of the illustrated operations are required to be performed.

In some cases, multi-tasking and parallel processing may be advantageous. Also, it should not be construed that the division of various system components are required in all types of implementation. It should be understood that the described program components and systems are generally integrated as a single software product or packaged into a multiple-software product.

Certain embodiments of the subject matter described herein have been described. Other embodiments are within the scope of the following claims.

For example, the operations recited in the claims may be performed in a different order and still achieve desirable results. By way of example, the process illustrated in the accompanying drawings does not necessarily require a particular illustrated sequence or sequential order to obtain desired results.

While this disclosure has been particularly shown and described with reference to an exemplary embodiment thereof, it will be understood by those skilled in the art that various changes in form and details may be made therein without departing from the scope of this disclosure as defined by the appended claims.

The present disclosure relates to a position providing method and apparatus using voice or image information. The position providing apparatus is installed in a server or a terminal device and calculates a user's current position based on the voice or image information.

The calculated current position is indicated on a map and offered to the terminal device, and it is allowed to easily identify the user's current position through only the user's terminal device without requiring any additional infrastructure regardless of GPS shadow areas.

The present disclosure has a good possibility of sales on the market or business and therefore has industrial applicability suitable for practical and apparent implementation.

What is claimed is:

1. A position providing apparatus comprising:
   a processor configured to:
      acquire voice information from a user about a plurality of buildings or facilities existing within a range of view of the user at a current position of the user; and
      extract identification information of the plurality of buildings or facilities from the voice information;
   a position calculator configured to:
      acquire location information of the plurality of buildings or facilities from the voice information based on the identification information; and
      determine the current position of the user as a position where all of the plurality of buildings or facilities would be visible to the user by analyzing a positional relationship between the user and each building or facility of the plurality of buildings or facilities extracted from the voice information; and
   a memory configured to store a map database including the identification information and the location information of the plurality of buildings or facilities.

2. The apparatus of claim 1, wherein the processor is further configured to extract the identification information of the plurality of buildings or facilities by converting the voice information into text.

3. The apparatus of claim 1, wherein the position calculator is further configured to associate and indicate the calculated current position with and on the stored map database.

4. A position providing method performed by a position providing apparatus, the method comprising:
   acquiring voice information from a user about a plurality of buildings or facilities existing within a range of view of the user at a current position of the user;
   extracting identification information of the plurality of buildings or facilities from the voice information;
   acquiring location information of the plurality of buildings or facilities from the voice information based on the identification information; and
   determining the current position of the user as a position where all of the plurality of buildings or facilities would be visible to the user by analyzing a positional relationship between the user and each building or facility of the plurality of buildings or facilities extracted from the voice information.

5. The method of claim 4, wherein extracting the identification information of the plurality of buildings or facilities comprises converting the voice information into text.

6. The method of claim 4, wherein the method further comprises:
   associating and indicating the calculated current position with and on a stored map database.

7. A non-transitory computer-readable recording medium having a program, recorded thereon, for executing a position providing method comprising:
   acquiring voice information from a user about a plurality of buildings or facilities existing within a range of view of a user at a current position of the user;
   extracting identification information of the plurality of buildings or facilities from the voice information;
   acquiring location information of the plurality of buildings or facilities from the voice information based on the identification information; and
   determining the current position of the user as a position where all of the plurality of buildings or facilities would be visible to the user by analyzing a positional relationship between the user and each building or facility of the plurality of buildings or facilities extracted from the voice information.

* * * * *